(12) United States Patent
Kim

(10) Patent No.: US 11,422,930 B2
(45) Date of Patent: Aug. 23, 2022

(54) CONTROLLER, MEMORY SYSTEM AND DATA PROCESSING SYSTEM

(71) Applicant: SK hynix Inc., Gyeonggi-do (KR)

(72) Inventor: Kwang Su Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/181,328

(22) Filed: Feb. 22, 2021

(65) Prior Publication Data

US 2022/0058116 A1    Feb. 24, 2022

(30) Foreign Application Priority Data

Aug. 18, 2020    (KR) .......................... 10-2020-0103345

(51) Int. Cl.
    *G06F 12/02*      (2006.01)
    *G06F 12/0873*      (2016.01)
    *G06F 13/16*      (2006.01)
    *G06F 12/0891*      (2016.01)

(52) U.S. Cl.
CPC ...... *G06F 12/0238* (2013.01); *G06F 12/0873* (2013.01); *G06F 12/0891* (2013.01); *G06F 13/1668* (2013.01); *G06F 2212/7201* (2013.01)

(58) Field of Classification Search
CPC ............. G06F 12/0238; G06F 12/0891; G06F 12/0873
See application file for complete search history.

(56) References Cited

U.S. PATENT DOCUMENTS

| | | | |
|---|---|---|---|
| 2013/0229861 A1* | 9/2013 | Ueda .................. | G11C 11/1673 365/158 |
| 2020/0320008 A1* | 10/2020 | Byun ................. | G06F 12/0873 |
| 2021/0255949 A1* | 8/2021 | Guda .................... | G06F 9/546 |

(Continued)

FOREIGN PATENT DOCUMENTS

KR    10-2020-0114149      10/2020

OTHER PUBLICATIONS

"IEEE Standard FASTBUS Modular High-Speed Data Acquisition and Control System and IEEE FASTBUS Standard Routines," in IEEE Std 960-1993, IEEE Std 1177-1993 , vol. No., pp. 1-317, Oct. 26, 1994.*

(Continued)

*Primary Examiner* — Pierre Michel Bataille
(74) *Attorney, Agent, or Firm* — IP & T Group LLP

(57) ABSTRACT

A memory system includes: a first memory subsystem suitable for storing a first segment of map data for first logical addresses in a logical address region; a second memory subsystem suitable for storing a second segment of map data for second logical addresses in the logical address region; and a host interface suitable for: providing any one of the first and second memory subsystems with a first read command of a host according to a logical address included in the read command, providing the host with an activation recommendation according to a read count of the logical address region including the provided logical address, providing map data for the first and second logical addresses obtained from the first and second memory subsystems, wherein the activation recommendation allows the host to further provide a physical address corresponding to a target logical address in the logical address region.

20 Claims, 8 Drawing Sheets

(56) References Cited

U.S. PATENT DOCUMENTS

2022/0058134 A1* 2/2022 Minopoli ............ G06F 12/0866

OTHER PUBLICATIONS

"IEEE Standard for Scalable Storage Interface," in IEEE Std 1285-2005, vol. No., pp. 1-140, Mar. 22, 2006.*

L. Ke et al., "RecNMP: Accelerating Personalized Recommendation with Near-Memory Processing," 2020 ACM/IEEE 47th Annual International Symposium on Computer Architecture (ISCA), 2020, pp. 790-803.*

* cited by examiner

ACTIVATION RECOMMENDATION

CONTROLLER, MEMORY SYSTEM AND DATA PROCESSING SYSTEM

CROSS-REFERENCE TO RELATED APPLICATION(S)

The present application claims priority under 35 U.S.C. § 119(a) to Korean Patent Application No. 10-2020-0103345, filed on Aug. 18, 2020, the disclosure of which is incorporated herein by reference in its entirety.

BACKGROUND

1. Field

Various embodiments of the present disclosure generally relate to a controller for controlling a memory device, and a memory system including the controller.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USS) memory devices, memory cards having various interfaces, and solid state drives (SSD).

SUMMARY

Various embodiments of the present disclosure are directed to a method and apparatus that enables providing a memory system with a request including a physical address of data to be read by a host, by providing, in a timely manner, the host with map data expected to be frequently referred to by the memory system.

In accordance with an embodiment, a memory system includes: a first memory subsystem suitable for storing a first segment of map data for first logical addresses in a logical address region; a second memory subsystem suitable for storing a second segment of map data for second logical addresses in the logical address region; and a host interface suitable for: providing any one of the first and second memory subsystems with a first read command of a host according to a logical address included in the read command, providing the host with an activation recommendation according to a read count of the logical address region including the logical address, obtaining the first and second segments of map data for the first and second logical addresses from the first and second memory subsystems, respectively, based on a read buffer command of the host, and providing the host with the first and second segments of map data combined as map data for the logical address region, wherein the activation recommendation allows the host to further provide, when providing a second read command including a target logical address in the logical address region, a physical address corresponding to the target logical address.

In accordance with an embodiment, a controller that controls first and second memory devices, includes: a first processor suitable for controlling the first memory device to store a first segment of map data for first logical addresses in a logical address region; a second processor suitable for controlling the second memory device to store a second segment of map data for second logical addresses in the logical address region; and a host interface suitable for: providing any one of the first and second processors with a read command of a host according to a logical address in the read command, providing the host with an activation recommendation according to a read count of the logical address region including the provided logical address, obtaining the first and second segments of map data for the first and second logical addresses from the first and second processors based on a read buffer command of the host, and providing the host with the first and second segments of map data combined as map data for the logical address region, wherein the activation recommendation allows the host to further provide, when providing a second read command including a target logical address in the logical address region, a physical address corresponding to the target logical address.

In accordance with an embodiment, a data processing system includes: a host configured to provide a first request together with a first logical address or a second logical address selected from a host map segment; first and second memory systems configured to store first and second map sub-segments having the first and second logical addresses, respectively, each of the first and second memory systems configured to perform an operation in response to the first request by referring to the provided logical address and the corresponding map sub-segment included therein; and a host interface configured to cause the host to update the host map segment with both of the first and second map sub-segments when a number of accesses to the first and second map sub-segments is greater than a threshold, wherein the first and second map sub-segments respectively have first and second map entries each having a logical address and a corresponding physical address, wherein the host is further configured to provide a second request together with the first map entry or the second map entry selected from the updated host map segment, and wherein each of the first and second memory systems is further configured to perform an operation in response to the second request by referring to the provided map entries corresponding thereto.

The features and advantages obtainable in the present disclosure are not limited to those described herein; those skilled in the art will recognize other features and advantages from the following detailed description.

DETAILED DESCRIPTION

Hereinafter, various embodiments of the present disclosure are described below in detail with reference to the accompanying drawings. The following description focuses on subject matter pertinent to the present disclosure; well-known technical detail may be omitted so as not obscure the subject matter of the disclosed embodiments. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
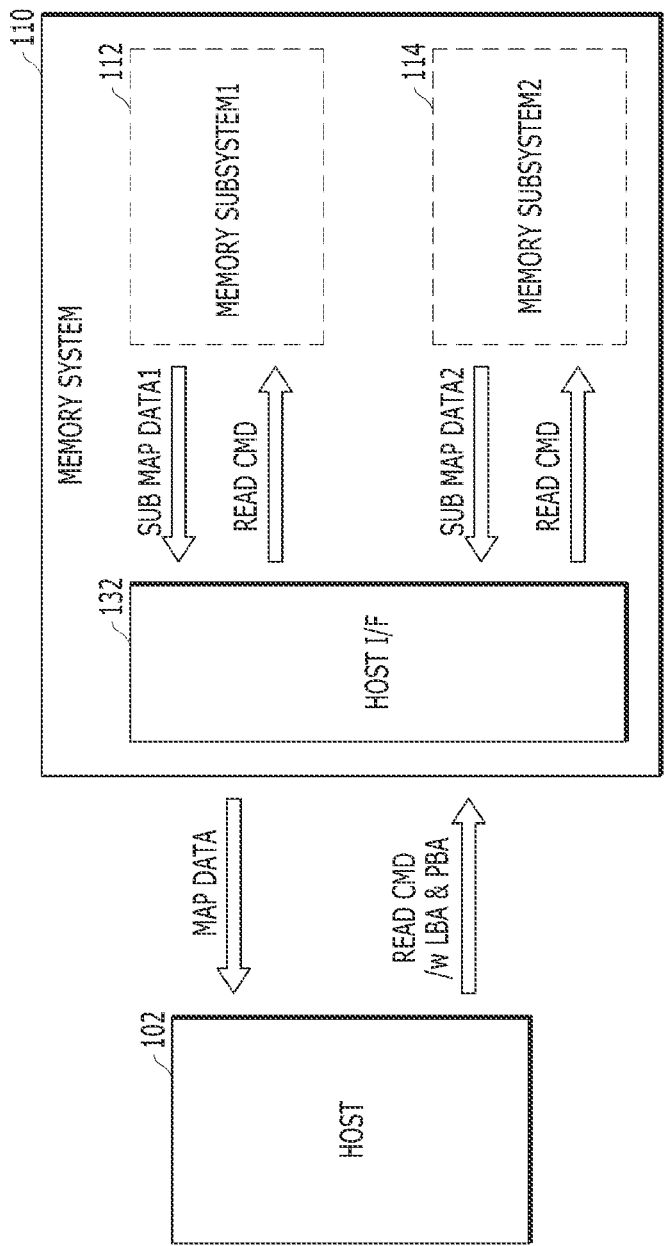
FIG. 1 is a diagram illustrating a method of sharing map data in accordance with an embodiment.

FIG. 1 is a diagram illustrating a method of sharing map data in accordance with an embodiment.

Referring to FIG. 1, a host 102 and a memory system 110 may operably engage to cooperate with each other. The host 102 may be a computing device and implemented in the form of a mobile device, a computer and/or a server. The memory system 110 may receive a command from the host 102 and store or output data in response to the received command.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall function and operation of the host 102, and provide operation between the host 102 and a user using the data processing system 100 or the memory system 110. The OS may support functions and operations corresponding to the use purpose and usage of a user. The OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 include a solid state drive (SSD), a mufti-media card (MMC), a secure digital (SD) card, a universal serial bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and/or micro-MMC. The SD card may include a mini-SD card and micro-SD card.

The memory system 110 may be embodied by any of various types of storage devices. Examples of such storage devices include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may have a storage space including nonvolatile memory cells.

In order to store data requested by the host 102 in the storage space, the memory system 110 may perform mapping of a file system used by the host 102 to the storage space. For example, an address associated with data according to the file system may be referred to as a logical address and an address associated with data in the storage space may be referred to as a physical address.

The memory system 110 may include a plurality of subsystems that can operate in parallel in order to improve data processing performance. In an example of FIG. 1, the memory system 110 may include a first memory subsystem 112, a second memory subsystem 114 and a host interface 132.

Each of the first and second memory subsystems 112 and 114 may store data used by the host 102, and include non-volatile memory cells.

The host interface 132 may support interfacing between the host 102 and the first and second memory subsystems 112 and 114.

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (DATA), enhanced small disk interface (ESDI) and integrated drive electronics (IDE).

The host interface 132 may drive firmware which is referred to as a host interface layer. According to an embodiment, the host interface 132 may be implemented as any one of CPU, TPU and a hardware accelerator.

The host interface 132 may distribute commands to the first and second memory subsystems 112 and 114 based on logical addresses included in the commands received from the host 102. For example, the host interface 132 may provide the first memory subsystem 112 with a command including an odd-numbered logical address, and provide the second memory subsystem 114 with a command including an even-numbered logical address.

In other words, the first and second memory subsystems 112 and 114 may access different storage spaces based on different logical addresses, respectively. Accordingly, the first and second memory subsystems 112 and 114 may store map data for different logical addresses in internal storage spaces, respectively. Hereinafter, the map data stored by the first memory subsystem 112 is referred to as first sub map data, and the map data stored by the second memory subsystem 114 is referred to as second sub map data.

When receiving a read command including a logical address from the host 102 through the host interface 132, the first and second memory subsystems 112 and 114 may search for a physical address, which corresponds to the logical address, based on the first and second sub map data stored therein, and then output data, which is stored at the physical address found in the search, to the host 102 through the host interface 132.

If the host 102 performs the physical address search instead of the memory system 110, the time it takes for the memory system 110 to output data corresponding to the read request provided by the host 102 may be reduced. In this situation, the host 102 may store map data that the host 102 may directly access to search for a physical address and provide the physical address found in the search to the memory system 110.

Referring to FIG. 1, the memory system 110 may provide the map data to the host 102.

When the memory system 110 provides the host 102 with all the map data stored therein, the host 102 may have difficulty in assigning a storage space in a memory within the host 102 to store all the map data received from the memory system 110. Accordingly, instead of providing the host 102 with all map data, the memory system 110 may selectively provide the host 102 with some map data.

When map data for a logical address to be read is stored in the host 102, the host 102 may provide the memory system 110 with a physical address obtained by referring to the map data. On the other hand, when the map data for the logical address to be read is not stored in the host 102, the host 102 may provide the memory system 110 with the logical address, and the memory system 110 may access an internal storage space with reference to internal map data.

Since the host 102 can directly search map data stored therein for a physical address corresponding to a logical address, the access performance of the memory system 110 may be improved when the probability that the map data for the logical address to be read by the host 102 has been stored in the host 102 is high. Accordingly, the memory system 110 may provide the host 102 with map data including a logical address, which is expected to be frequently read by the host 102, among internal map data so as to improve the read operation performance.

Since the host 102 may directly perform a physical address search for the logical address in the host map data, the higher the probability that a logical address to be read by the host 102 is included in the host map data, the better the access performance of the memory system 110. Accordingly, in order to improve read operation performance, the map manager 136 may recommend map data, which includes a logical address expected to be frequently read by the host 102 among the memory map data, to the host 102. The memory system 110 may provide the host 102 with the map data in response to a request of the host 102.

Depending on the spatial locality and temporal locality of a memory, a recently and frequently accessed logical address and adjacent logical addresses may be frequently accessed in the future. Accordingly, based on the read tendency of the host 102 for each logical address region, the memory system 110 may expect one or more logical addresses to be frequently read. For example, the expectation that a particular logical address may be frequently read may be based on a read count for each logical address region. The memory system 110 may provide the host 102 with map data corresponding to a logical address region whose read count exceeds a threshold.

When the memory system 110 includes the plurality of memory subsystems 112 and 114, logical addresses included in each of logical address regions may be distributed to the plurality of memory subsystems 112 and 114. That is, each of the memory subsystems 112 and 114 may receive only read commands for logical addresses of the corresponding logical address region, and store only map data associated with the corresponding logical address region. Accordingly, it is difficult for each of the memory subsystems 112 and 114 to perform a read count for each logical address region and to provide the host 102 with map data of a logical address region that expected to be frequently read by the host 102.

According to an embodiment, when a read command is received from the host 102, the host interface 132 may perform the read count for each logical address region, and select a logical address region, which is expected to be frequently read, according to a read count result. The host interface 132 may obtain first sub map data and second sub map data for the selected logical address region from the plurality of memory subsystems 112 and 114, and provide the host 102 with the first and second sub map data as map data of the selected logical address region.

According to an embodiment, even though the map data of a single logical address region is divided and that map data are utilized in different memory subsystems, the host interface 132 may effectively predict the single logical address region to be frequently read by the host 102, and provide the host 102 with all map data of the single logical address region. Accordingly, the host 102 may directly search physical addresses for a logical address that is frequently read by the host 102, thereby improving the read operation performance of the memory system 110.

Figure 2:
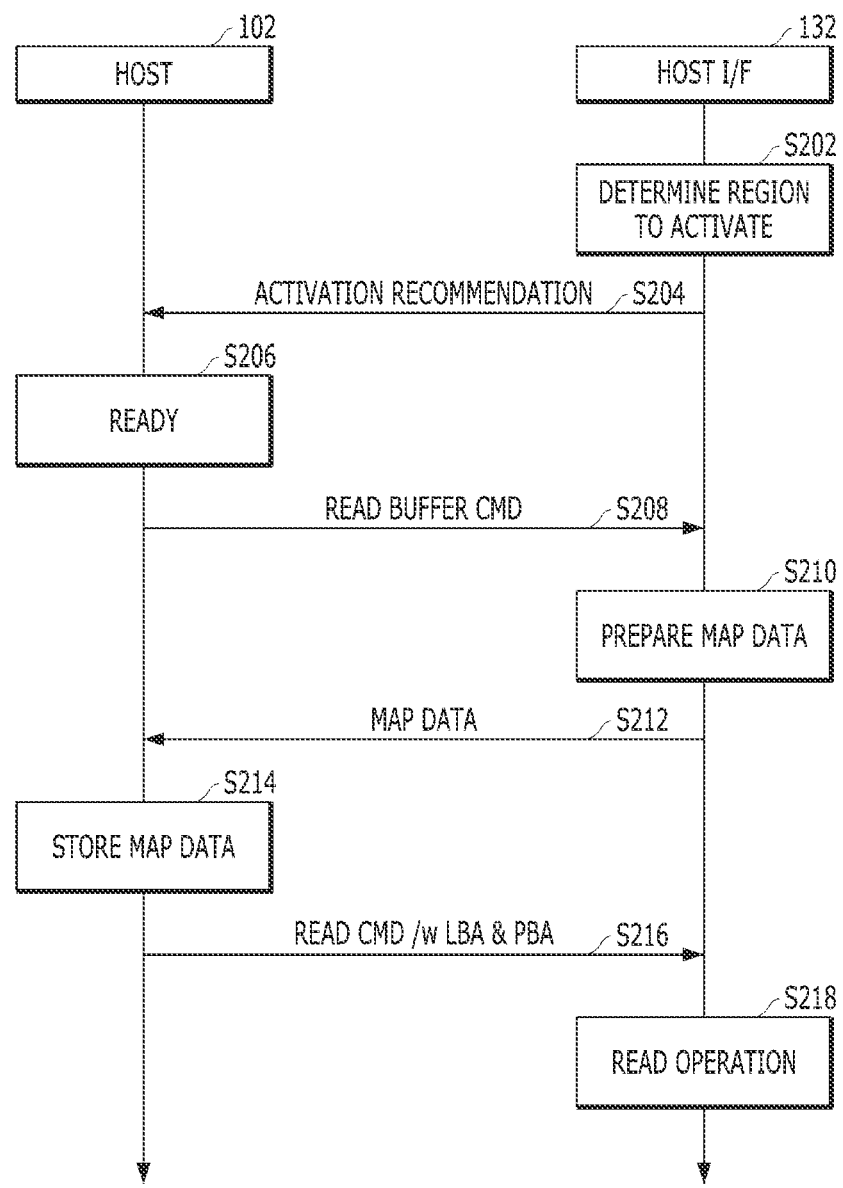
FIG. 2 is a diagram schematically illustrating operations of a host interface and a host in accordance with an embodiment.

FIG. 2 is a diagram schematically illustrating operations of the host interface 132 and the host 102 in accordance with an embodiment.

In operation S202, the host interface 132 may determine the number of reads that have been performed for each logical address region based on a read command received from the host 102 to generate a read count for each logical address region, and determine whether or not a logical address region is to be activated according to a read count result. Herein, the activating of the logical address region by the host interface 132 refers to allowing the host 102 directly to search for a physical address of the logical address region by providing the host 102 with map data of the logical address region, and when the host 102 provides the memory system 110 with a read command, allowing the host 102 to provide the read command including the physical address.

In operation S204, the host interface 132 may provide the host 102 with an activation recommendation for the logical address region so that the host 102 activates the logical address region.

In operation S206, the host 102 may prepare to receive map data of the logical address region in response to the activation recommendation of the host interface 132. For example, the host 102 may allocate an internal storage space for storing the map data.

In operation S208, the host 102 may provide the host interface 132 with a read buffer command to obtain the map data from the host interface 132. The read buffer command may be for reading a buffer in the memory system 110.

In operation S210, the host interface 132 may prepare the map data of the logical address region in response to the read buffer command. For example, the host interface 132 may receive first and second sub map data constituting the map data from the first and second memory subsystems 112 and 114, respectively.

In operation S212, the host interface 132 may provide the host 102 with the prepared map data.

In operation S214, the host 102 may store the map data in the allocated internal storage space.

In operation S216, the host 102 may transfer, to the memory system 110, the read command including a logical address LBA and a physical address PBA, by using the map data stored therein.

In operation S218, the memory system 110 may perform a requested operation, by using the physical address PBA included in the read command.

Figure 3:
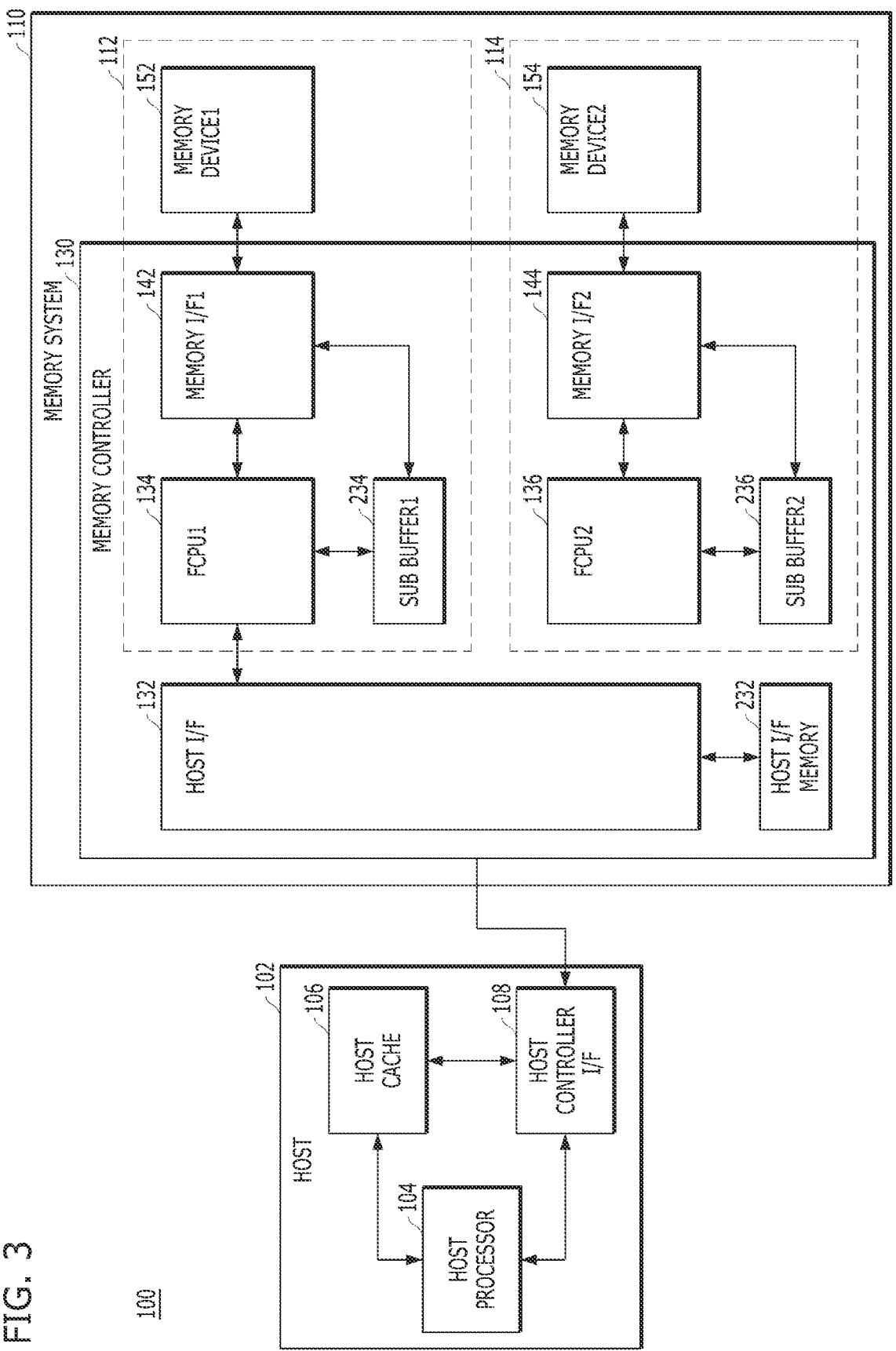
FIG. 3 is a diagram illustrating a data processing system including a memory system in accordance with an embodiment.

FIG. 3 is a diagram illustrating a data processing system 100 including a memory system 110 in accordance with an embodiment.

The data processing system 100 may include a host 102 and the memory system 110. The host 102 and the memory system 110 of FIG. 3 may correspond to the host 102 and the memory system 110 described above with reference to FIG. 1, respectively.

The memory system 110 may include first and second memory devices 152 and 154 and a controller 130 that controls the first and second memory devices 152 and 154.

The memory controller 130 and the first and second memory device 152 and 154 may be integrated into a single semiconductor device. For example, the memory controller 130 and the first and second memory device 152 and 154 may be integrated as one semiconductor device to constitute a solid state drive (SSD). When the memory system 110 is used as an SSD, the operating speed of the host 102 connected to the memory system 110 can be improved. In another embodiment, the memory controller 130 and the first and second memory device 152 and 154 may be integrated as one semiconductor device to constitute a memory card, such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Each of the first and second memory devices 152 and 154 may be a nonvolatile memory device that retains data stored therein even though power is not supplied. Each of the first and second memory devices 152 and 154 may store data provided from the host 102 through a program operation, and provide data stored therein to the host 102 through a read operation. Each of the first and second memory devices 152 and 154 may include a plurality of memory blocks, each of which may include a plurality of pages, and each of the pages may include a plurality of memory cells coupled to a word line. In an embodiment, each of the first and second memory devices 152 and 154 may be a flash memory, The flash memory may have a 3-dimensional (3D) stack structure.

The memory controller 130 may control the first and second memory devices 152 and 154 in response to a request from the host 102. For example, the memory controller 130 may provide data read from either or both of the first and second memory devices 152 and 154 to the host 102, and store data provided from the host 102 in one or both of the first and second memory devices 152 and 154. In general, the memory controller 130 may control read, program and erase operations of the first and second memory devices 152 and 154.

The controller 130 may include a host interface 132, a host interface memory 232, first and second FCPU (FTL CPU)s 134 and 136, first and second memory interfaces 142 and 144 and first and second sub buffers 234 and 236.

The first memory subsystem 112 described with reference to FIG. 1 may include the first FCPU 134, the first memory interface (I/F) 142, the first sub buffer 234 and the first memory device 152, The second memory subsystem 114 described with reference to FIG. 1 may include the second FCPU 136, the second memory interface (I/F) 144, the second sub buffer 236 and the second memory device 154.

The host interface 132 corresponds to the host interface 132 described with reference to FIG. 1. The host interface 132 may distribute commands, which are inputted from the host 102, to the first and second FCPUs 134 and 136 based on logical addresses included in the commands. For example, the host interface 132 may provide the first FCPU 134 with a command including a logical address having a first value as a result of a modulo operation, and provide the second FCPU 136 with a command including a logical address having a second value as the result of the modulo operation. The logical address having the first value as the result of the modulo operation may be an odd-numbered logical address, and the logical address having the second value as the result of the modulo operation may be an even-numbered logical address.

The host interface memory 232 may store data for driving the host interface 132. The data that can be stored in the host interface memory 232 according to an embodiment is described below with reference to FIGS. 6A to 6C.

The first and second FCPUs 134 and 136 may control overall operations of the first and second memory subsystems 112 and 114, respectively. Each of the first and second FCPUs 134 and 136 may be implemented as a CPU, and drive firmware, which is referred to as a flash translation layer (FTL), in order to control the general operations of the first and second memory subsystems 112 and 114.

Each of the first and second FCPUs 134 and 136 may drive the FTL to perform a foreground operation corresponding to a command received from the host 102. For example, the first FCPU 134 may control the first memory device 152 in response to a command including an odd-numbered logical address. In addition, the second FCPU 136 may control the second memory device 154 in response to a command including an even-numbered logical address.

Also, the first and second FCPUs 134 and 136 may perform a background operation on the first and second memory device 152 and 154, respectively. The background operation may include a garbage collection (GC) operation, a wear-leveling (WL) operation, a map flush operation, or a bad block management operation.

The first and second memory interfaces 142 and 144 may serve as a memory/storage interface for interfacing the first and second FCPUs 134 and 136 and the first and second memory devices 152 and 154, respectively. When each of the first and second memory devices 152 and 154 is a flash memory, specifically a NAND flash memory, the first and second memory interfaces 142 and 144 may generate a control signal for the first and second memory devices 152 and 154 and process data to be provided to the first and second memory devices 152 and 154 under the control of the first and second FCPUs 134 and 136, respectively. The first and second memory interfaces 142 and 144 may work as an interface (e.g., a NAND flash interface) for processing a command and data between the first and second FCPUs 134 and 136 and the first and second memory device 152 and 154, respectively. Specifically, the first memory I/F 142 may support data transfer between the first FCPU 134 and the first memory device 152, and the second memory I/F 144 may support data transfer between the second FCPU 136 and the second memory device 154.

Each of the first and second memory interfaces 142 and 144 may be driven through firmware referred to as a flash interface layer (FIL) in order to exchange data with its associated memory device 152 or 154.

The first and second sub buffers 234 and 236 may store data for driving the first and second memory subsystems 112 and 114, respectively. For example, the first and second sub buffers 234 and 236 may buffer the data until the data received through the host interface 132 are stored in the first and second memory devices 152 and 154, respectively. Further, the first and second sub buffers 234 and 236 may buffer the data in order to transfer, to the host 102, data outputted from the first and second memory devices 152 and 154, respectively. In addition, the first and second sub buffers 234 and 236 may store first and second map data for converting logical addresses into physical addresses by the first and second FCPUs 134 and 136, respectively.

The host 102 may include a host processor 104, a host cache 106 and a host controller interface 108.

The host 102 may include the host processor 104 and the host cache 106, which give the host 102 higher performance and larger capacity as compared with the memory system 110. Unlike the memory system 110, the host processor 104 and the host cache 106 have a spatial limitation but the hardware thereof may be upgraded as needed. Accordingly, in order to improve operational efficiency, the memory system 110 may utilize resources of the host 102.

In accordance with an embodiment, the storage space of the host cache 106 of the host 102 may be up to thousands of times greater than the first and second sub buffers 234 and 236 of the first and second FCPUs 134 and 136, respectively. Accordingly, the memory system 110 may provide the host cache 106 with memory map data used by the first and second FCPUs 134 and 136, thereby allowing the host cache 106 to be used as a cache memory for an address translation operation performed by the memory system 110. In such a case, based on host map data cached in the host cache 106, the host 102 may translate a logical address into a physical address and then provide the physical address to the memory system 110 together with a request. In that case, the memory system 110 need not translate the logical address into the physical address. Rather, the memory system 110 need only access one or the other of the first and second memory devices 152 and 154 based on the provided physical address. Thus, it is possible to reduce the operation burden on the first and second FCPUs 134 and 136 in using the first and second sub buffer 234 and 236, thereby improving the operational efficiency of the memory system 110.

Even though the memory system 110 provides the map data to the host 102, the memory system 110 may still manage the map data, for example, perform update, deletion, and generation of the map data. This is because the first and second FCPUs 134 and 136 performs a background operation such as garbage collection and wear leveling according to the operation state of the first and second memory devices 152 and 154 and determines a physical location in the first and second memory devices 152 and 154 at which data received from the host 102 is stored, so that a physical address of data in the first and second memory device 152 and 154 may be changed by the first and second FCPUs 134 and 136.

The host map data may include L2P map data for identifying a physical address corresponding to a logical address. Meta data for indicating that a logical address and a physical address correspond to each other may include L2P map data for identifying the physical address corresponding to the logical address and P2L map data for identifying the logical address corresponding to the physical address. The host map data may include the L2P map data. The P2L map data is mainly used for an internal operation of the memory system 110, and may not be used for an operation in which the host 102 stores data in the memory system 110 or reads data corresponding to a specific logical address from the memory system 110. In accordance with an embodiment, the P2L map data may not be sent from the memory system 110 to the host 102.

The first and second FCPUs 134 and 136 may store the L2P map data or the P2L map data in the first and second memory device 152 and 154, respectively, while managing (i.e., generating, deleting, updating, and the like) the L2P map data or the P2L map data. Since the host cache 106 is a volatile memory, the host map data may be lost when an event, such as interruption of the supply of power to the host 102 and the memory system 110, occurs. Accordingly, the first and second FCPUs 134 and 136 may not only maintain the host map data in its most recent state, but also store the most recent L2P map data or the P2L map data in the first and second memory devices 152 and 154, respectively.

Figure 4:
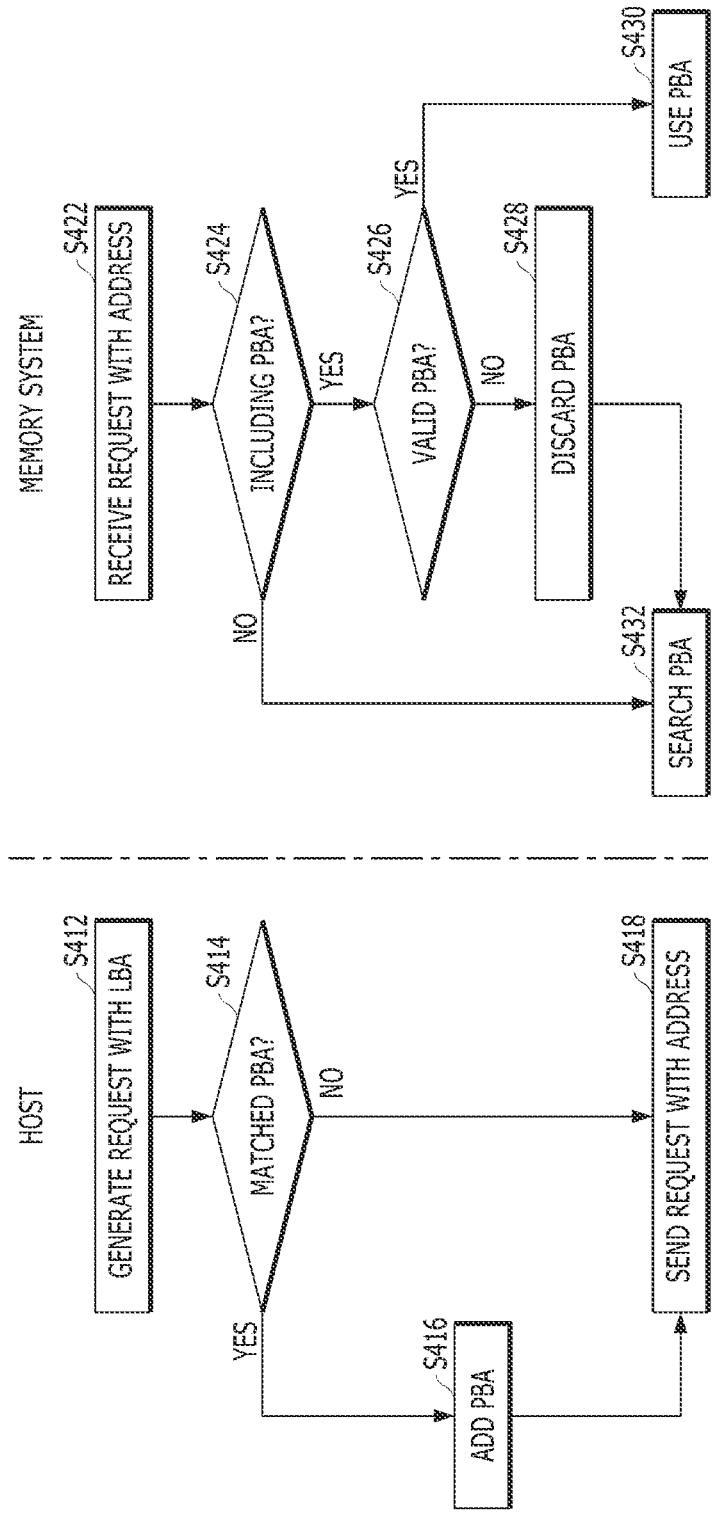
FIG. 4 is a diagram illustrating specific operations of a host, which transfers a command including logical and physical addresses, and a memory system, which receives the command from the host.

FIG. 4 illustrates specific operations of the host 102, which transfers a command including logical and physical addresses (LBA and PBA), and the memory system 110, which receives the command from the host 102.

Referring to FIG. 4, in operation S412, the host 102 may generate a request including the logical address LBA. Subsequently, in operation S414, the host 102 may check whether the physical address PBA corresponding to the logical address LBA is present in map data. When the physical address PBA is not present in the map data (that is, "NO" in operation S414), the host 102 may transfer the request including the logical address LBA in operation S418.

On the other hand, when the physical address PBA is present in the map data (that is, "YES" in operation S414), the host 102 may add the physical address PBA to the request including the logical address LBA, in operation S416. In operation S418, the host 102 may transfer the request including the LBA and PBA.

The memory system 110 may receive a request from an external device, in operation S422. For example, the host interface 132 may provide any one of the first and second memory subsystems 112 and 114 with the request, based on a logical address included in the request of the host 102.

In operation S424, the memory system 110 may check whether the physical address PBA is included in the received request. When the physical address PBA is not included in the received request (that is, "NO" in operation S424), the memory system 110 may search for a physical address corresponding to the logical address included in the received request, in operation S432.

When the physical address PBA is included in the received request (that is, "YES" in operation S424), the memory system 110 may check whether the physical address PBA is valid, in operation S426. The memory system 110 may transfer the map data to the host 102, and the host 102 may perform a mapping operation based on the map data transferred by the memory system 110, and transfer the request including the physical address PBA. However, after the memory system 110 transfers the map data to the host 102, the map data managed by the memory system 110 may be changed or updated. As such, when the map data is in a dirty state, the physical address PBA transferred by the host 102 cannot be used as it is. Thus, the memory system 110 may determine whether the physical address PBA included in the received request is valid. When the physical address PBA included in the received request is valid (that is, "YES" in operation S426), the memory system 110 may perform an operation corresponding to the request, by using the physical address PBA, in operation S430.

When the physical address PBA included in the received request is not valid (that is, "NO" in operation S426), the memory system 110 may discard the physical address PBA included in the received request, in operation S428. In this case, the memory system 110 may search for the physical address PBA based on the logical address LBA included in the received request, in operation S432.

When map data in a map segment of the memory system 110 is updated, a physical address in the map segment stored by the host 102 may become invalid. When the host 102 searches for an invalid physical address and provides the memory system 110 with a read command including the invalid physical address, the memory system 110 cannot use the invalid physical address and thus needs to search for a valid physical address. When the map segment stored by the host 102 includes multiple invalid physical addresses, the host 102 and the memory system 110 need to repeatedly search for valid physical addresses, and thus the efficiency of physical address search may decrease.

Accordingly, the memory system 110 may deactivate a logical address region that has been activated in the past and in which map data has been updated. The deactivating of the previously activated logical address region by the host interface 132 refers to notifying the host 102 to no longer search for a physical address of the logical address region and to provide the memory system 110 with a read command that does not include the physical address for the logical address region. The host interface 132 may provide the host 102 with a deactivation recommendation to deactivate the activated logical address region.

Figure 5A:
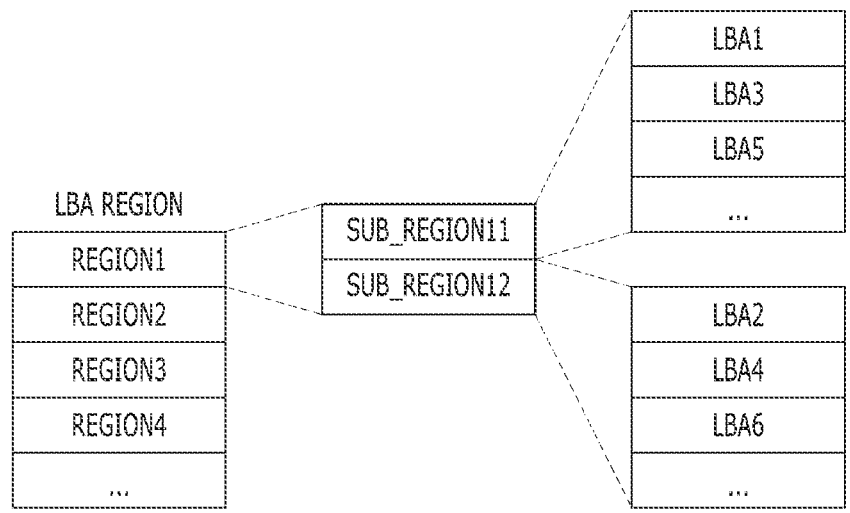
FIGS. 5A and 5B are diagrams illustrating memory map data in accordance with an embodiment.
Figure 5B:
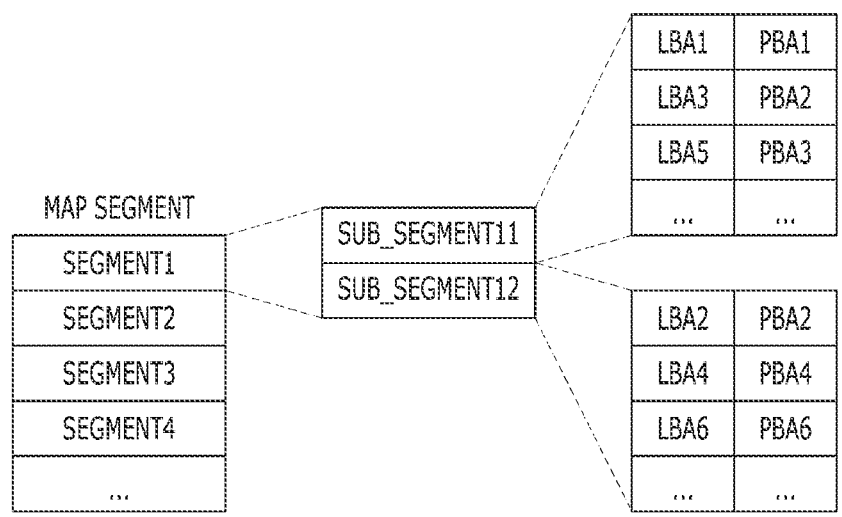

FIGS. 5A and 5B are diagrams illustrating memory map data in accordance with an embodiment.

FIG. 5A illustrates a logical address region.

As illustrated above with reference to FIG. 1, the memory system 110 may identify, for each logical address region including consecutive logical addresses, the number of times the corresponding logical address region is accessed for a read operation to generate a read count, in order to effectively predict logical addresses likely to be read in the future by the host 102. The read count of a logical address region may represent the number of times that a read command including logical address(es) within the logical address region is received from the host 102. The read count of each logical address region may be referred to as an activation count of the corresponding logical address region.

Each of first to fourth regions REGION1 to REGION4 illustrated in FIG. 5A represents a logical address region. Each of REGION1 to REGION4 may include a group of consecutive logical addresses. For example, REGION1 may include logical addresses LBA1 to LBA100, and REGION2 may include logical addresses LBA101 to LBA200.

FIG. 5A illustrates an $11^{th}$ sub region SUB_REGION11 and a $12^{th}$ sub region SUB_REGION12 of the first region REGION1. SUB_REGION11 may include odd-numbered logical addresses among the logical addresses included in REGION1. SUB_REGION12 may include even-numbered logical addresses among the logical addresses included in REGION1.

Although FIG. 5A describes as an example that one logical address region, e.g., REGION1, is divided into two sub regions and the two sub regions that include odd-numbered logical addresses and an even-numbered logical addresses, respectively. However, the present invention is not limited to that specific configuration. For example, when the memory system 110 includes four memory subsystems, one logical address region may be divided into four sub regions, and logical addresses in that one logical address region may be distributed to the four sub regions according to a result of a modulo operation.

FIG. 5B illustrates a map segment included in the memory map data.

The memory map data may include a plurality of map segments. First to fourth segments SEGMENT1 to SEGMENT4 illustrated in FIG. 5B may include the map data of the logical addresses of the first to fourth regions REGION1 to REGION4, respectively.

FIG. 5B illustrates an $11^{th}$ sub segment SUB_SEGMENT11 and a $12^{th}$ sub segment SUB_SEGMENT12 of SEGMENT1. SUB_SEGMENT11 may include map data of logical addresses of SUB_REGION11, and SUB_SEGMENT12 may include map data of logical addresses of SUB_REGION12.

As shown in FIG. 5B by way of example for SEGMENT2, each of the plurality of map segments may include a first sub segment including first map data of map entries of odd-numbered logical addresses and a second sub segment including second map data of map entries of even-numbered logical addresses. Each map entry may include a logical address-physical address pair. The first sub segment of each map segment may be stored in the first sub buffer 234 and the first memory device 152, and the second sub segment of each map segment may be stored in the second sub buffer 236 and the second memory device 154.

The host interface 132 may provide the host 102 with an activation recommendation when the activation count of a specific logical address region exceeds a threshold value, and may obtain the first and second sub segments, both of which correspond to the logical address region, from the first and second sub buffers 234 and 236 according to a read buffer request of the host 102 and provide the host 102 with the first and second sub segments. In addition, the host interface 132 may provide the host 102 with a deactivation recommendation so as to deactivate the activated logical address region according to whether the map data included in the first and second sub segments are updated.

The host interface memory 232 may store data for determining whether to provide the activation recommendation or the deactivation recommendation.

Figure 6A:
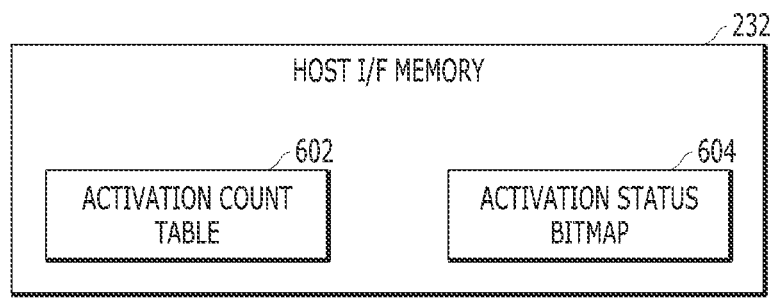
FIGS. 6A to 6C are diagrams illustrating data that can be stored in a host interface memory in accordance with an embodiment.
Figure 6B:
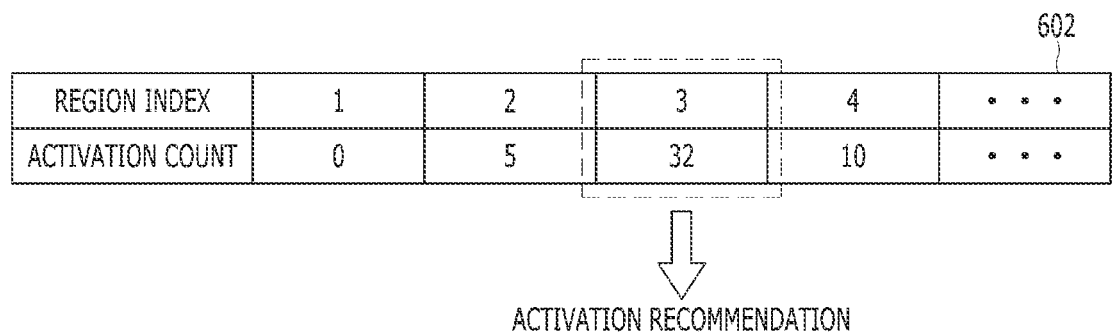
Figure 6C:
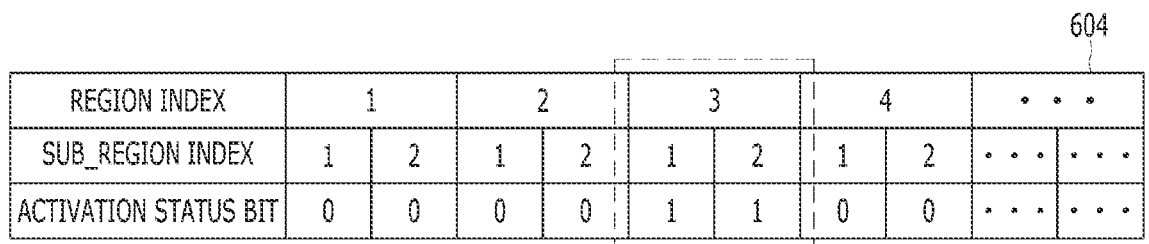

FIGS. 6A to 6C are diagrams illustrating data that can be stored in the host interface memory 232 in accordance with an embodiment.

FIG. 6A illustrates the data that can be stored in the host interface memory 232.

The host interface memory 232 may store an activation count table 602 and an activation status bitmap 604. The activation count table 602 may store an activation count for each logical address region. The activation status bitmap 604 may store whether sub logical address regions included in each of a plurality of logical address regions are activated.

FIG. 6B illustrates the activation count table 602.

The host interface 132 may update the activation count of a logical address region in the activation count table 602 whenever a read command including a logical address in the logical address region is received from the host 102. With reference to the activation count table 602, the host interface 132 may provide the host 102 with an activation recommendation for a logical address region having an activation count equal to or greater than a threshold value.

FIG. 6B illustrates a case in which the host interface 132 provides the host 102 with an activation recommendation for a third region because the activation count of the third region is equal to or greater than the threshold value, which may be 32 in this example. An activation recommendation is not made for any of the other regions (e.g., first, second or fourth) because the activation count for each is less than the threshold value.

FIG. 6C illustrates the activation status bitmap 604.

The host interface 132 may obtain first and second sub segments, corresponding to a specific logical address region, from the first and second sub buffers 234 and 236 according to a read buffer request of the host 102, provide the host 102 with the first and second sub segments, and then set a bit value, corresponding to each of the first and second sub logical address regions included in the logical address region, to "1".

FIG. 6C illustrates a case in which the bit value corresponding to each of the first and second sub regions included in the third region is set to "1" after the third region is activated.

Figure 7:
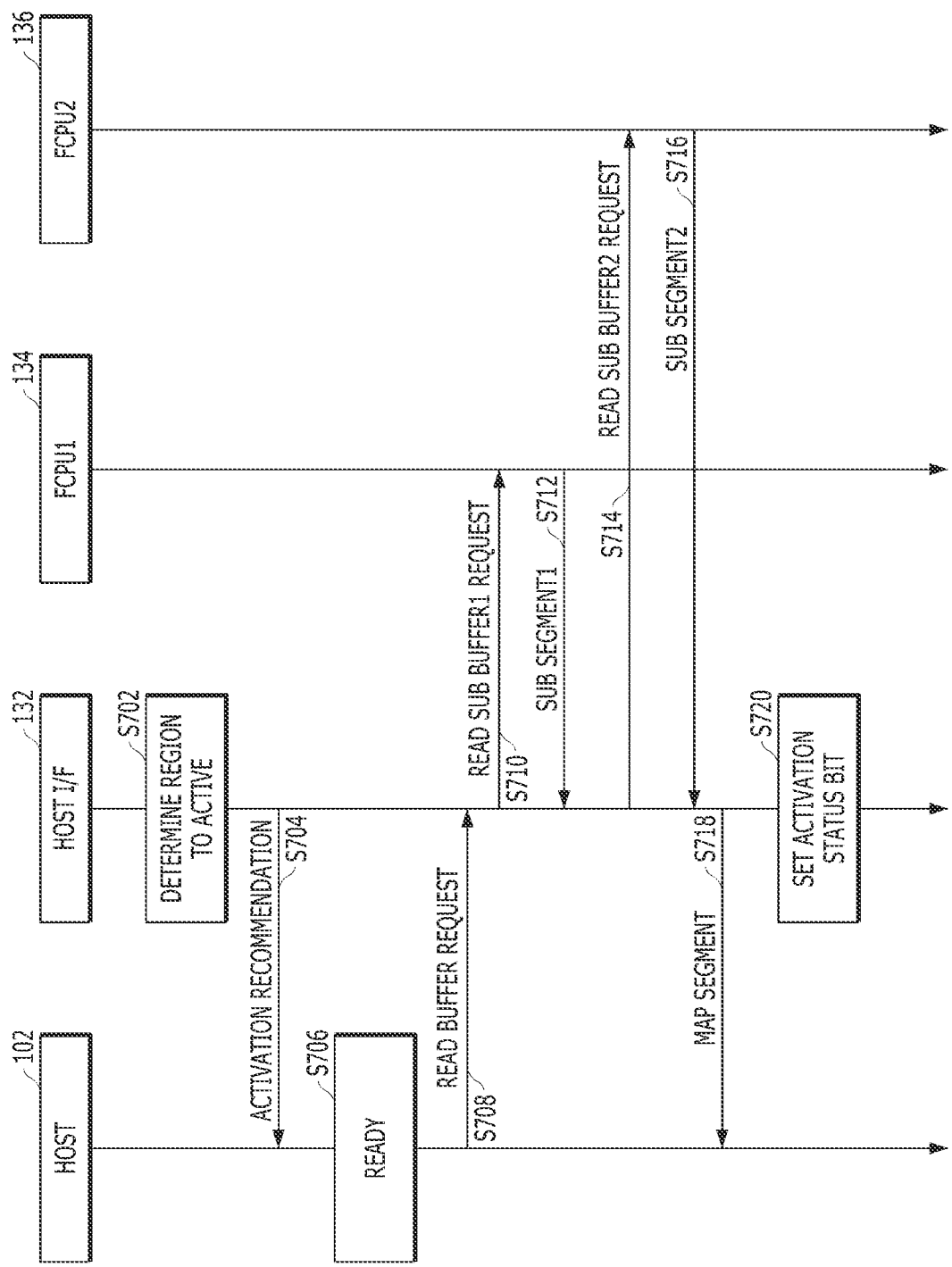
FIG. 7 is a diagram illustrating a logical address region activating operation of a memory system in accordance with an embodiment.

FIG. 7 illustrates a logical address region activating operation of the data processing system 100 in accordance with an embodiment.

In operation S702, the host interface 132 may determine a logical address region to be activated. As described with reference to FIG. 6B, the host interface 132 may determine the logical address region(s) to be activated, based on an activation count for each logical address region. Hereinafter, each logical address region to be activated is referred to as an activation target logical address region.

In operation S704, the host interface 132 may provide the host 102 with an activation recommendation for an activation target logical address region.

In operation S706, the host 102 may prepare to receive a target segment, which is a map segment corresponding to the activation target logical address region, in response to the activation recommendation. For example, the host 102 may allocate the host cache 106 for storing the target segment.

When the host 102 is prepared to receive the target segment, the host 102 may provide the memory system 110 with a read buffer request in operation S708.

The read buffer request refers to a request provided by the host 102 for reading a buffer of the memory system 110. The host 102 may provide the memory system 110 with the read buffer request so as to obtain the target segment stored in the buffer of the memory system 110. The target segment may be divided into first and second sub target segments and stored in the first and second sub buffers 234 and 236, respectively. For example, the first sub target segment for odd-numbered logical addresses of the logical address region may be stored in the first sub buffer 234, and the second sub target segment for even-numbered logical addresses of the logical address region may be stored in the second sub buffer 236.

The host interface 132 may provide the first FCPU 134 with a first read buffer request so as to obtain the first sub target segment, in operation S710. The host interface 132 may provide the second FCPU 136 with a second read buffer request so as to obtain the second sub target segment, in operation S714.

The first FCPU 134 may provide the host interface 132 with the first sub target segment, which has been buffered in the first sub buffer 234 in operation S712, in response to the first read buffer request of operation S710. The first sub buffer 234 may store information on whether the first sub target segment is activated.

The second FCPU 136 may provide the host interface 132 with the second sub target segment, which has been buffered in the second sub buffer 236 in operation S716, in response to the second read buffer request of operation S714. The second sub buffer 236 may store information on whether the second sub target segment is activated.

In operation S718, the host interface 132 may combine the first and second sub target segments to form the target segment, and provide the host 102 with the target segment.

In operation S720, the host interface 132 may set the activation status bits for first and second sub regions, included in the activation target logical address region, to "1". The host 102 may convert a logical address to a physical address by referring to the target segment received from the memory system 110, in order to access the activation target logical address region, and provide the host interface 132 with a read command including the logical and physical addresses.

Figure 8:
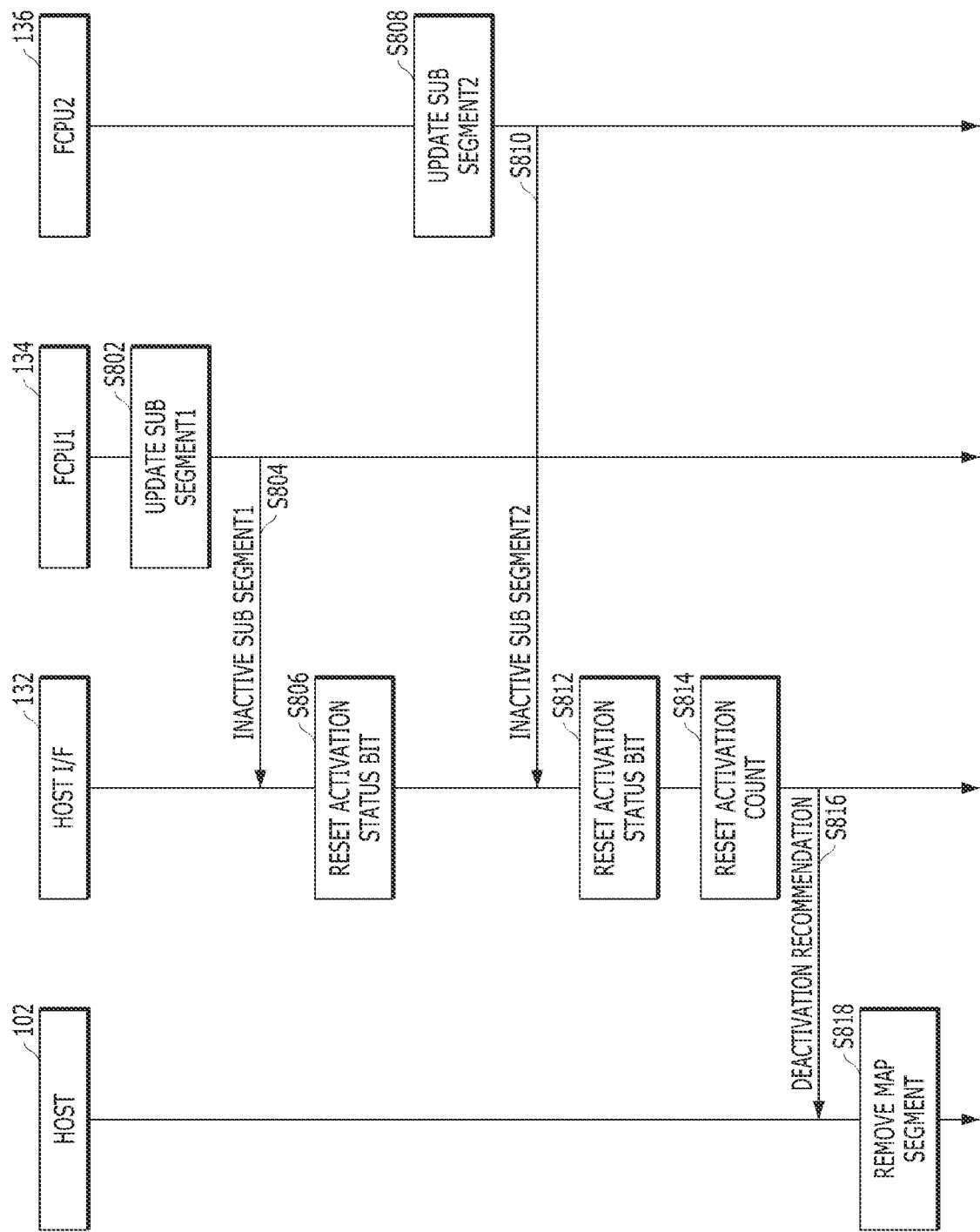
FIG. 8 is a diagram illustrating a logical address region deactivating operation of a memory system in accordance with an embodiment.

FIG. 8 is a diagram illustrating a logical address region deactivating operation of the data processing system 100 in accordance with an embodiment.

In operation S802, the first FCPU 134 may update a first sub segment. For example, the first FCPU 134 may change mapping between the logical address and the physical address in response to a write command for an odd-numbered logical address, and update the first sub segment including the logical address.

In operation S804, when the updated first sub segment is for an activated logical address region, the first FCPU 134 may provide a deactivation signal for a first sub region corresponding to the first sub segment. Referring to operation S712, the first sub buffer 234 may store information on whether the first sub segment is activated. Therefore, the first FCPU 134 may determine whether the first sub segment is related to the activated logical address region.

In operation S806, the host interface 132 may reset a bit for the first sub region to "0" in the activation status bitmap 604 in response to the deactivation signal of the first FCPU 134.

In operation S808, the second FCPU 136 may update a second sub segment. For example, the second FCPU 136 may change mapping between the logical address and the physical address in response to a write command for an even-numbered logical address, and update the second sub segment including the logical address.

In operation S810, when the updated second sub segment is for an activated logical address region, the second FCPU 136 may provide a deactivation signal for a second sub region corresponding to the second sub segment. Referring to operation S716, the second sub buffer 236 may store information on whether the second sub segment is activated. Therefore, the second FCPU 136 may determine whether the segment sub segment is related to the activated logical address region.

In operation S812, the host interface 132 may reset a bit for the second sub region to "0" in the active state bitmap 604 in response to the deactivation signal of the second FCPU 136.

When all the bits for the first and second sub regions included in a specific activated logical address region among the plurality of map segments are reset to "0", the host interface 132 may deactivate the activated logical address region in operations S814, S816 and S818.

In operation S814, the host interface 132 may reset the activation count of the activated logical address region in the activation count table 602.

In operation S816, the host interface 132 may provide the host 102 with a deactivation recommendation for the activated logical address region.

In operation S818, the host 102 may deactivate the activated logical address region by removing the map segment, corresponding to the activated logical address region, from the host cache 106.

According to an embodiment, the memory system 110 may include the first and second memory subsystems 112 and 114 and the host interface 132. The first memory subsystem 112 may store data for first, e.g., odd-numbered, logical addresses, and the second memory subsystem 114 may store data for second, e.g., even-numbered, logical addresses. The host interface 132 may sort a plurality of logical addresses into logical address regions, in groups of consecutive logical addresses. Each of the logical address regions may include first logical addresses and second logical addresses, and a map segment corresponding to each of the logical address regions may be divided into sub segments, some of which are stored in the first memory subsystem 112 and others are stored in the second memory subsystem 114.

The host interface 132 may provide any one of the first and second memory subsystems 112 and 114 with a read command based on the logical address included in the read command of the host 102, identify a logical address region among multiple logical regions based on their respective activation counts, obtain map data included in the map segment from the first and second memory subsystems 112 and 114 according to a result of the activation counts inspection, and provide the host 102 with the map data.

According to an embodiment, even when map data for one logical address region is divided and that map data are utilized in the different first and second memory subsystems 112 and 114, the host interface 132 may allow the host 102 to easily search physical addresses for a logical address, by providing the host 102 with the whole map segment of the single logical address region.

According to embodiments, a method and apparatus enable timely receipt by a memory system from a host a request including a physical address of data to be read, by providing, in a timely manner, the host with map data expected to be frequently referred to by the memory system.

Advantages and effects of the present disclosure are not limited to those described above; those skilled in the art to which the present disclosure pertains will appreciate from the above detailed description that additional advantages and effects are obtainable as well.

While specific embodiments have been illustrated and described herein, it will be apparent to those skilled in the art in view of the present disclosure that various changes and modifications may be made without departing from the scope of the invention. Therefore, the scope of the present invention is not limited to the described embodiments. Rather, the present invention encompasses all such changes and modifications that fall within the scope of the claims including their equivalents.

What is claimed is:

1. A controller that controls first and second memory devices, comprising:
a first processor configured to control the first memory device to store a first segment of map data for first logical addresses in a logical address region;
a second processor configured to control the second memory device to store a second segment of map data for second logical addresses in the logical address region; and
a host interface configured to:
provide any one of the first and second processors with a first read command of a host according to a logical address in the read command,
provide the host with an activation recommendation according to a read count of the logical address region including the provided logical address,
obtain the first and second segments of map data for the first and second logical addresses from the first and second processors based on a read buffer command of the host, and
provide the host with the first and second segments of map data combined as map data for the logical address region,
wherein the activation recommendation allows the host to further provide, when providing a second read command including a target logical address in the logical address region, a physical address corresponding to the target logical address.

2. The controller of claim 1, wherein, when the physical address is valid, the any one processor controls a memory device corresponding to the any one processor to perform a read operation based on the physical address, and
Wherein, when the physical address is invalid, the any one memory subsystem converts the target logical address into a corresponding physical address based on the map data, and reads data stored therein based on the corresponding physical address.

3. The controller of claim 1,
wherein the first processor provides the host interface with a deactivation signal when the first segment of map data of the first logical addresses are updated,
wherein the second processor provides the host interface with a deactivation signal when the second segment of map data of the second logical addresses are updated,
wherein the host interface provides the host with a deactivation recommendation in response to the deactivation signals of the first and second processors, and
wherein the deactivation recommendation notifies the host to not provide a physical address when providing a third read command including a logical address within the logical address region.

4. The controller of claim 3, wherein the any one processor controls a memory device corresponding to the any one processor to convert the logical address of the third read command into a corresponding physical address based on the map data and perform a read operation based on the physical address.

5. The controller of claim 4, wherein the host interface initializes the read count of the logical address region.

6. The controller of claim 4,
further comprising a memory configured to store an activation status bitmap indicating whether each of a first sub region including the first logical addresses and a second sub region including the second logical addresses is activated,
wherein the host interface sets activation status bits of the activation status bitmap for the first and second sub regions when providing the host with the map data for the logical address region.

7. The controller of claim 6, wherein the host interface resets the activation status bits for the first sub region in response to the deactivation signal of the first processor and resets the activation status bits for the second sub region in response to the deactivation signal of the second processor.

8. The controller of claim 1, wherein the logical address region includes consecutive logical addresses, and the first logical addresses are different from the second logical addresses.

9. The controller of claim 8, wherein the first logical addresses are odd-numbered logical addresses, and the second logical addresses are even-numbered logical addresses.

10. A memory system comprising:
a first memory subsystem configured to store a first segment of map data for first logical addresses in a logical address region;
a second memory subsystem configured to store a second segment of map data for second logical addresses in the logical address region; and
a host interface configured to:
provide any one of the first and second memory subsystems with a first read command of a host according to a logical address included in the read command,
provide the host with an activation recommendation according to a read count of the logical address region including the provided logical address,
obtain the first and second segments of map data for the first and second logical addresses from the first and second memory subsystems, respectively, based on a read buffer command of the host, and
provide the host with the first and second segments of map data combined as map data for the logical address region,
wherein the activation recommendation allows the host to further provide, when providing a second read command including a target logical address in the logical address region, a physical address corresponding to the target logical address.

11. The memory system of claim 10, wherein, when the physical address is valid, the any one memory subsystem reads data stored therein based on the physical address, and
wherein, when the physical address is invalid, the any one memory subsystem converts the target logical address into a corresponding physical address based on the map data, and reads data stored therein based on the corresponding physical address.

12. The memory system of claim 10,
wherein the first memory subsystem provides the host interface with a deactivation signal when the first segment of map data of the first logical addresses are updated,
wherein the second memory subsystem provides the host interface with a deactivation signal when the second segment of map data of the second logical addresses are updated,
wherein the host interface provides the host with a deactivation recommendation in response to the deactivation signals of the first and second memory subsystems, and
wherein the deactivation recommendation notifies the host to not provide a physical address when providing a third read command including a logical address in the logical address region.

13. The memory system of claim 12, wherein the any one memory subsystem converts the logical address of the third read command into a corresponding physical address based on the map data and reads data stored therein based on the physical address.

14. The memory system of claim 13, wherein the host interface initializes the read count for the logical address region in connection with providing the host with the deactivation recommendation.

15. The memory system of claim 13,
further comprising a memory configured to store an activation status bitmap indicating whether each of a first sub region including the first logical addresses and a second sub region including the second logical addresses is activated,
wherein the host interface sets activation status bits of the activation status bitmap for the first and second sub regions when providing the host with the map data for the logical address region.

16. The memory system of claim 15, wherein the host interface resets the activation status bits for the first sub region in response to the deactivation signal of the first memory subsystem, and resets the activation status bits for the second sub region in response to the deactivation signal of the second memory subsystem.

17. The memory system of claim 10, wherein the logical address region includes consecutive logical addresses, and the first logical addresses are different from the second logical addresses.

18. The memory system of claim 17, wherein the first logical addresses are odd-numbered logical addresses, and the second logical addresses are even-numbered logical addresses.

19. The memory system of claim 10,
wherein the first memory subsystem includes a first memory device configured to store the first segment of map data for the first logical addresses and a first processor configured to perform mapping between the first logical addresses and a physical address of the first memory device, and
wherein the second memory subsystem includes a second memory device configured to store the second segment of map data for the second logical addresses and a second processor configured to perform mapping between the second logical addresses and a physical address of the second memory device.

20. A data processing system comprising:
a host configured to provide a first request together with a first logical address or a second logical address selected from a host map segment;
first and second memory systems configured to store first and second map sub-segments having the first and second logical addresses, respectively, each of the first and second memory systems configured to perform an operation in response to the first request by referring to the provided logical address and the corresponding map sub-segment included therein; and
a host interface configured to cause the host to update the host map segment with both of the first and second map sub-segments when a number of accesses to the first and second map sub-segments is greater than a threshold,
wherein the first and second map sub-segments respectively have first and second map entries each having a logical address and a corresponding physical address,
wherein the host is further configured to provide a second request together with the first map entry or the second map entry selected from the updated host map segment, and
wherein each of the first and second memory systems is further configured to perform an operation in response to the second request by referring to the provided map entries corresponding thereto.

* * * * *